(12) United States Patent
Sogawa

(10) Patent No.: US 7,623,700 B2
(45) Date of Patent: Nov. 24, 2009

(54) STEREOSCOPIC IMAGE PROCESSING APPARATUS AND THE METHOD OF PROCESSING STEREOSCOPIC IMAGES

(75) Inventor: Yoshiyuki Sogawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 845 days.

(21) Appl. No.: 10/669,790

(22) Filed: Sep. 25, 2003

(65) Prior Publication Data

US 2004/0061712 A1 Apr. 1, 2004

(30) Foreign Application Priority Data

Sep. 27, 2002 (JP) ............. P. 2002-282644

(51) Int. Cl.
*G06K 9/00* (2006.01)
*H04N 15/00* (2006.01)
(52) U.S. Cl. ............... 382/154; 382/285; 348/42; 356/12; 359/462
(58) Field of Classification Search .......... 382/154, 382/285, 104; 345/419–427; 356/12–14; 348/42–60, 113–120; 359/462–477; 352/57–65; 33/20.4; 353/7–9; 378/41–42; 396/324–331; 701/301
See application file for complete search history.

(56) References Cited

U.S. PATENT DOCUMENTS

| 3,901,595 | A | | 8/1975 | Helava, et al. | |
| 5,734,743 | A | * | 3/1998 | Matsugu et al. ........... | 382/154 |
| 6,327,536 | B1 | * | 12/2001 | Tsuji et al. ............... | 701/301 |
| 2001/0045979 | A1 | * | 11/2001 | Matsumoto et al. .......... | 348/43 |

FOREIGN PATENT DOCUMENTS

| EP | 1 087 205 A | 3/2001 |
| JP | 2001-082927 | 3/2001 |
| JP | 2002-267441 | 3/2001 |
| JP | 2002-267441 | 9/2002 |

OTHER PUBLICATIONS

European Search Report dated Nov. 22, 2007.
Kanade, Takeo, et al., "A Stereo matching algorithm with an adaptive window: theory and experiment", Proceedings of the International Conference on Robotics and Automation, Sacramento, Apr. 9-11, 1991, Los Alamitos, IEEE Comp. Soc. Press, US, vol. 2, Conf. 7.
Japanese Office Action dated Jul. 31, 2008 with English Translation.

* cited by examiner

*Primary Examiner*—Aaron W Carter
(74) *Attorney, Agent, or Firm*—McGinn IP Law Group, PLLC

(57) ABSTRACT

A stereo matching section of a stereoscopic image processing unit evaluates a correlation of brightness between a reference pixel block picked up from a right image and a comparison pixel block picked up from a left image and calculates a parallax between these two pixel blocks having the correlation. A region control section changes over the size of these pixel blocks according to the area in which the stereo matching is performed so as to obtain a more accurate three-dimensional recognition.

19 Claims, 6 Drawing Sheets

FIG.4A
REFERENCE PIXEL BLOCK

| A11 | A12 | A13 | A14 | A15 | A16 | A17 | A18 |
|-----|-----|-----|-----|-----|-----|-----|-----|
| A21 | A22 | A23 | A24 | A25 | A26 | A27 | A28 |
| A31 | A32 | A33 | A34 | A35 | A36 | A37 | A38 |
| A41 | A42 | A43 | A44 | A45 | A46 | A47 | A48 |
| A51 | A52 | A53 | A54 | A55 | A56 | A57 | A58 |
| A61 | A62 | A63 | A64 | A65 | A66 | A67 | A68 |
| A71 | A72 | A73 | A74 | A75 | A76 | A77 | A78 |
| A81 | A82 | A83 | A84 | A85 | A86 | A87 | A88 |

— P Bij
— CENTRAL REGION
— SURROUNDING REGION

FIG.4B
COMPARISON PIXEL BLOCK

| B11 | B12 | B13 | B14 | B15 | B16 | B17 | B18 |
|-----|-----|-----|-----|-----|-----|-----|-----|
| B21 | B22 | B23 | B24 | B25 | B26 | B27 | B28 |
| B31 | B32 | B33 | B34 | B35 | B36 | B37 | B38 |
| B41 | B42 | B43 | B44 | B45 | B46 | B47 | B48 |
| B51 | B52 | B53 | B54 | B55 | B56 | B57 | B58 |
| B61 | B62 | B63 | B64 | B65 | B66 | B67 | B68 |
| B71 | B72 | B73 | B74 | B75 | B76 | B77 | B78 |
| B81 | B82 | B83 | B84 | B85 | B86 | B87 | B88 |

— P Bij
— CENTRAL REGION
— SURROUNDING REGION

FIG.5A

PIXEL BLOCK (8 × 8 PIXELS)

| 1.0 | 1.0 | 1.0 | 1.0 | 1.0 | 1.0 | 1.0 | 1.0 |
|---|---|---|---|---|---|---|---|
| 1.0 | 1.0 | 1.0 | 1.0 | 1.0 | 1.0 | 1.0 | 1.0 |
| 1.0 | 1.0 | 1.0 | 1.0 | 1.0 | 1.0 | 1.0 | 1.0 |
| 1.0 | 1.0 | 1.0 | 1.0 | 1.0 | 1.0 | 1.0 | 1.0 |
| 1.0 | 1.0 | 1.0 | 1.0 | 1.0 | 1.0 | 1.0 | 1.0 |
| 1.0 | 1.0 | 1.0 | 1.0 | 1.0 | 1.0 | 1.0 | 1.0 |
| 1.0 | 1.0 | 1.0 | 1.0 | 1.0 | 1.0 | 1.0 | 1.0 |
| 1.0 | 1.0 | 1.0 | 1.0 | 1.0 | 1.0 | 1.0 | 1.0 |

P Bij — CENTRAL REGION — SURROUNDING REGION

FIG.5B

PIXEL BLOCK (4 × 4 PIXELS)

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 1.0 | 1.0 | 1.0 | 1.0 | 0 | 0 |
| 0 | 0 | 1.0 | 1.0 | 1.0 | 1.0 | 0 | 0 |
| 0 | 0 | 1.0 | 1.0 | 1.0 | 1.0 | 0 | 0 |
| 0 | 0 | 1.0 | 1.0 | 1.0 | 1.0 | 0 | 0 |
| 0 | 0 | 0 | 0 | 0 | 0 | 0 | 0 |
| 0 | 0 | 0 | 0 | 0 | 0 | 0 | 0 |

P Bij — CENTRAL REGION — SURROUNDING REGION

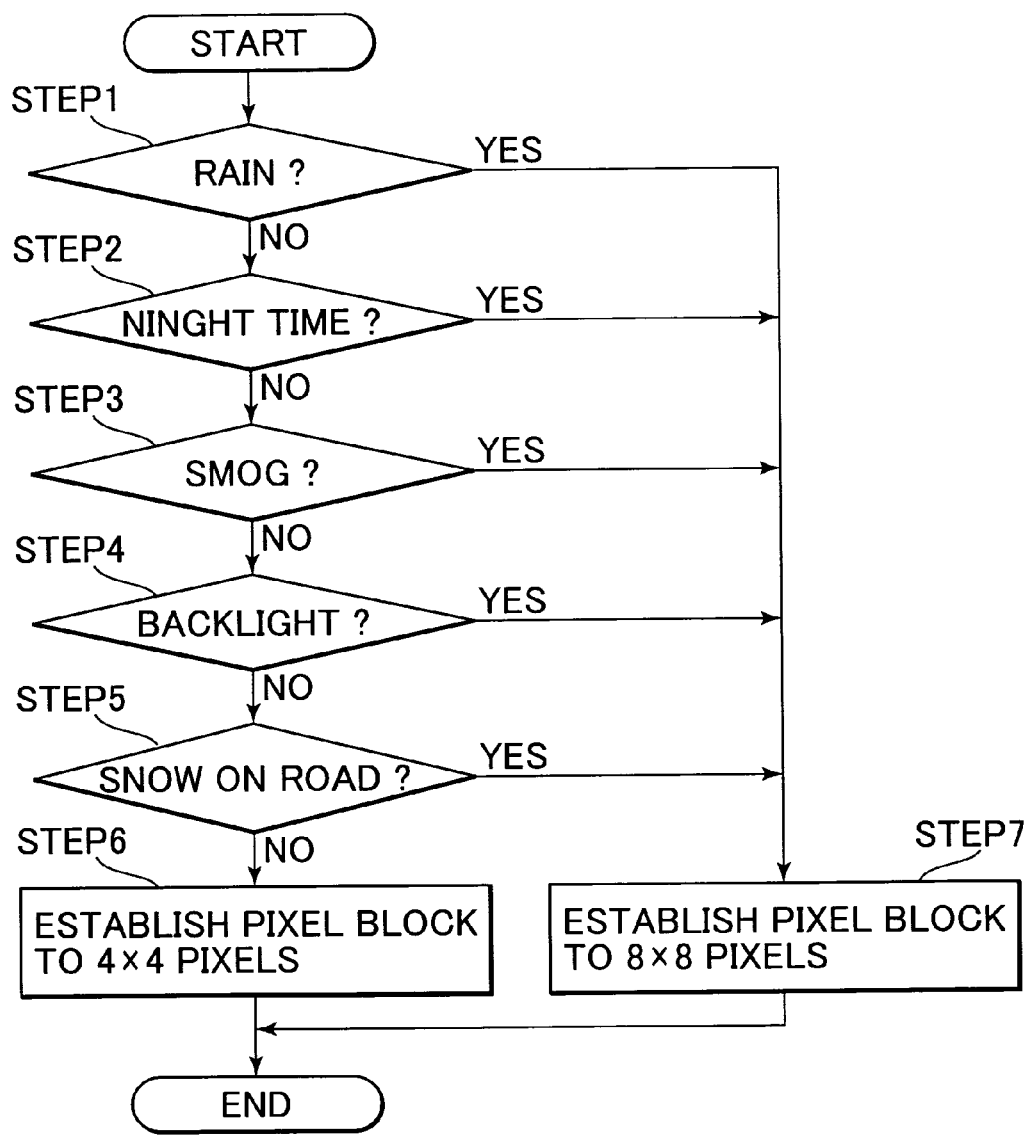

STEREOSCOPIC IMAGE PROCESSING APPARATUS AND THE METHOD OF PROCESSING STEREOSCOPIC IMAGES

BACKGROUND OF THE INVENTION

1. Field of the Invention

The present invention relates to a stereoscopic image processing apparatus. More particularly, the present invention relates to a stereoscopic image processing apparatus in which so-called stereo matching is performed using a variable size of the small image region and to the method of such stereo matching.

2. Discussion of Related Arts

In recent years, a stereoscopic image processing apparatus for calculating a distance to an object using a pair of picture images, has been put to practical use. The stereoscopic image processing apparatus calculates a positional deviation between a pair of images of an object, namely, a parallax. In calculating the parallax, a plurality of small image regions, that is, pixel blocks are provided in a lateral line on one reference image and the other comparison image, respectively and groups of pixel blocks positionally corresponding to each other are picked up from one frame of picture image (stereo matching) and a group of parallaxes is calculated for every frame of picture image. Distance data corresponding to each coordinate position of the picture image are calculated from the parallaxes.

In evaluating the correlation of brightness characteristic between reference and comparison pixel blocks, as disclosed in Japanese Patent Laid-open No. Toku-Kai 2002-267441, the pixel block of a large area or size is advantageous from the point of the reliability of the stereo matching because of its increased number of pixels included in the block.

However, in case of using the pixel block of a large size, there is a likelihood that the position of a target pixel block from which a parallax is calculated is deviated from the actual coordinate position corresponding to the parallax calculated with respect to the pixel block, because, when the correlation of brightness between the paired pixel blocks is evaluated, the position of the identified pixel blocks on the comparison image is largely affected by a portion having a large brightness change. Accordingly, the pixel block having a large size produces erroneous correlations leading to a positional deviation of parallaxes. As a result, this positional deviation of parallaxes has a possibility of exacerbating the recognition accuracy of objects. In case of an object opposing to an axis of the camera, the recognition accuracy is not affected so much, however, in case of objects obliquely imaged like grounds, roads, the deviation of parallaxes has a serious effect leading to an erroneous recognition of grounds.

Further, under adverse image conditions such as rains, nighttime and the like, since the image has weaker contrasts than in fine weather, if the security of the stereo matching is a first priority, the pixel block having a large size is more advantageous. Under such situations as being able to obtain the security of the stereo matching, however, the small size pixel block is advantageous in consideration of the positional deviation of parallaxes. In prior arts, in processing the stereo matching, the size of the pixel block has been treated as unchanged in such a condition as neglecting either of these problems.

SUMMARY OF THE INVENTION

It is an object of the present invention to provide a stereoscopic image processing apparatus capable of enhancing the reliability of the stereo matching and of calculating parallaxes with high precision.

A stereoscopic image processing apparatus for calculating a parallax between a pair of images comprise correlation evaluating means for evaluating a correlation of brightness between a reference pixel block provided in one of the pair of images and a comparison pixel block provided in the other of the pair of images and region size changing over means for changing over a size of the reference and comparison pixel blocks. According to a first aspect of the present invention, the size of the reference and comparison pixel blocks is changed over in accordance with an area where the reference pixel block is located. The size of those pixel blocks is changed over to a large size when the comparison small region is located in a lower area of the image.

According to a second aspect of the present invention, the size of the pixel blocks is changed over in accordance with imaging conditions such as rain, fog, snow, backlight, nighttime, snow on roads, stains or droplets on front windshield and the like.

BRIEF DESCRIPTION OF THE DRAWINGS

FIG. 4a is an explanatory view showing an example of a reference pixel block;

FIG. 4b is an explanatory view showing an example of a comparison pixel block;

FIG. 5a is an explanatory view showing an example of weighting factors established in a pixel block of 8×8 pixels;

FIG. 5b is an explanatory view showing an example of weighting factors established in a pixel block of 4×4 pixels;

FIG. 7 is a flowchart showing processes for changing over the size of a pixel block.

DETAILED DESCRIPTION OF THE PREFERRED EMBODIMENTS

Figure 1:
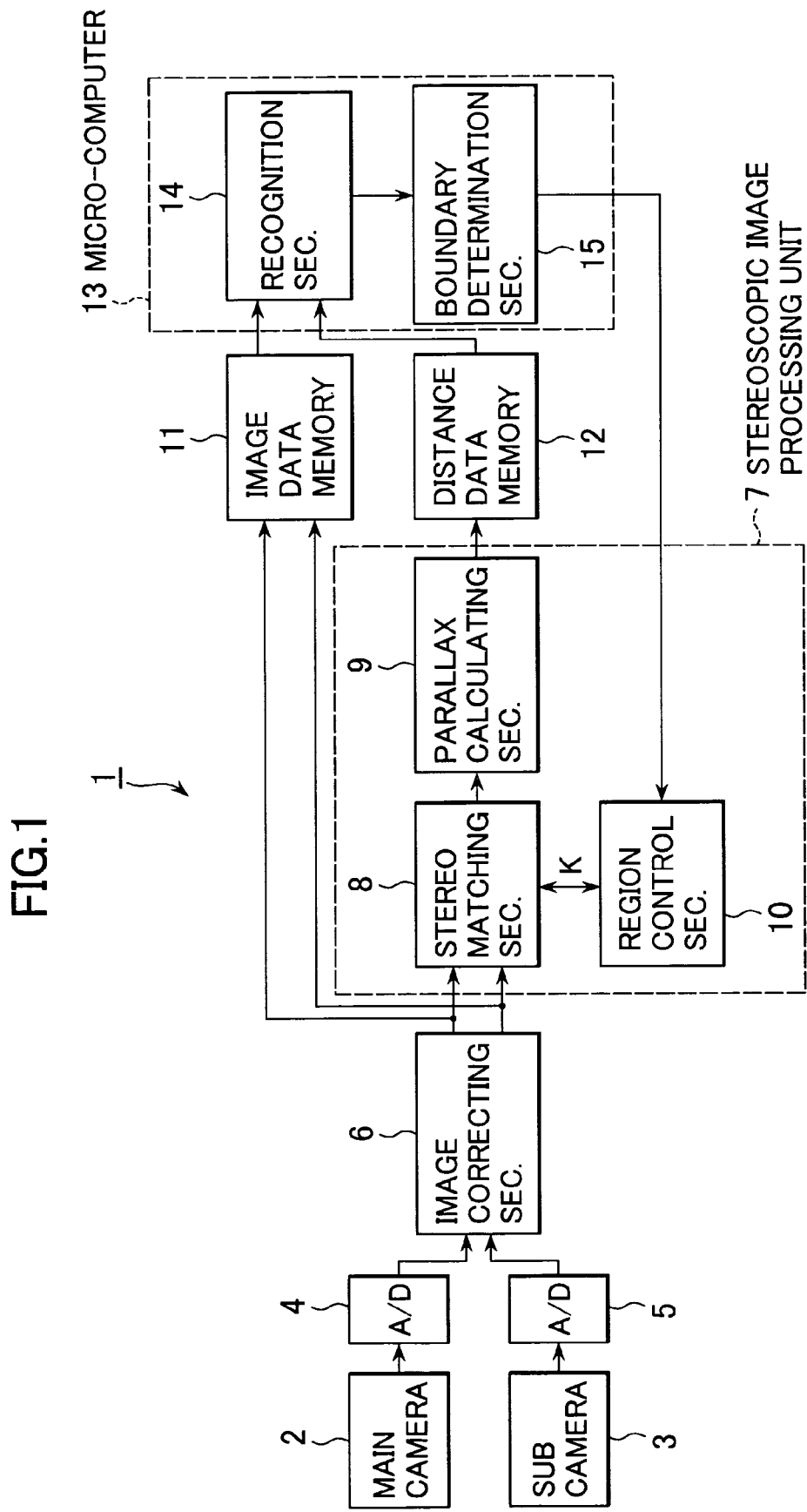
FIG. 1 is a schematic block diagram showing a stereoscopic image processing apparatus according to a first embodiment of the present invention.

Referring now to FIG. 1, reference numeral 1 denotes a stereoscopic image processing apparatus functioning as a part of a vehicle surroundings monitoring apparatus. The stereoscopic image processing apparatus 1 recognizes circumstances in front of an own vehicle based on information given through stereoscopic image processes from a pair of images.

A stereoscopic camera for imaging exterior sceneries is mounted in the vicinity of a room mirror of an own vehicle and is constituted by a pair of main and sub cameras 2, 3. The respective cameras 2, 3 incorporate an image sensor (CCD sensor, CMOS sensor or the like). The main camera 2 takes reference (right) images and the sub camera 3 takes comparison (left) image and these images are used for the stereoscopic image processing. Analogue images are outputted from the respective cameras 2, 3 in a mutually synchronized condition and are converted into digital images having a specified number of gradations (for example, 256 gradations in gray scale) by A/D converters 4, 5.

A pair of digitized image data are subjected to brightness corrections, geometrical conversions and the like in an image correcting section 6. Generally, the installation of the paired cameras 2, 3 in the vehicle is accompanied by errors to some extent and the left and right have deviations caused by these errors, respectively. In order to correct the deviations, the geometrical conversions such as rotations, parallel translations of images are performed using the Affine transformation.

Through these image processes, reference images are obtained from the main camera 2 and comparison images are obtained from the sub camera 3. Thus obtained image data are constituted by a set of pixels having brightness ranging from 0 to 255. The image plane formed by the image data is expressed by the i-j coordinate system having an origin at the left bottom corner of the image. The i coordinate axis extends in a horizontal direction of the image plane and the j coordinate axis extends in a vertical direction. The stereoscopic image data for one frame are outputted to a stereoscopic image processing unit 7 which will be described hereinafter and stored in an image data memory 11.

The stereoscopic image processing unit 7 is constituted by a stereo matching section 8, a parallax calculating section 9 and a region control section 10 and calculates distance data of the picture image for one frame based on the reference image data and the comparison image data. The distance data are a group of parallaxes, that is, a set of parallaxes d calculated one by one for every reference pixel block PBij. The pixel block is an image region having a specified size on the image plane formed by the reference image data and a calculation unit for one parallax.

In calculating the parallax d with respect to a certain reference pixel block PBij on the reference image, a comparison pixel block (having the same size as that of the reference pixel block) of which brightness characteristic having a correlation with that of the reference pixel block PBij is identified in the comparison image. The distance to an object projected on the stereoscopic image is expressed as a parallax in the stereoscopic image, that is, a horizontal deviation between the reference image and the comparison image. Accordingly, in searching a comparison pixel block having a correlation in the comparison image, such comparison pixel block should be searched on the same horizontal line (epipolar line) as j coordinate. The stereo matching section 8 evaluates the brightness correlation between the reference pixel block and the comparison pixel block, while the comparison pixel block is shifted successively every one pixel on the epipolar line within a specified range of i coordinate established by the position of the reference pixel block PBij. Then, based on the result of the evaluation, the reference parallax calculating section 9 establishes the horizontal deviation of the comparison pixel block having a highest correlation from the reference pixel block to a parallax d of the pixel block PBij.

Thus, the stereo matching section 8 evaluates the correlation between the reference pixel block Pbij and the comparison pixel block using so-called "city block distance", one of correlation evaluation methods. The comparison pixel block having a correlation with the reference pixel block is located at a position where the city block distance CB becomes minimum.

Since the parallax d is an essential parameter in transforming two-dimensional planes to three-dimensional spaces, the resolution of distance data, that is, the recognition ability of three-dimensions rises with an increased number of the parallax data. Normally, the size of the pixel block PBij necessary for the stereo matching is around 4×4 pixels. For example, in case where the specified size of the pixel block PBij is established to 4×4 pixels, 50×128 parallaxes are calculated from one frame of image.

Figure 2:
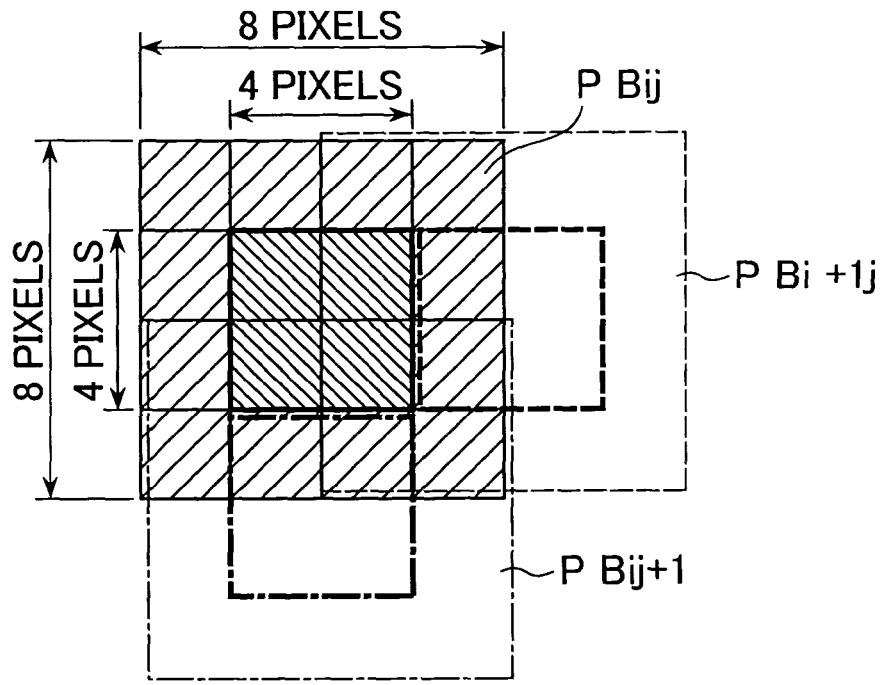
FIG. 2 is an explanatory view showing a pixel block having a larger size than specified.

An increase of the number of pixels in the block, that is, the up-sizing of the pixel block PBij is preferable from the view point of increasing brightness information in order to ensure the stereo matching. As shown in FIG. 2, a pixel block PBij having 8×8 pixels for example can be obtained by enlarging the width of the pixel block having 4×4 pixels around the pixel block PBij by 4 pixels left and right, upward and downward, respectively.

In up-sizing the pixel block PBij, however, there is a possibility that the coordinate position corresponding to the parallax d of the pixel block PBij differs from the coordinate position corresponding to the calculated parallax Z of the enlarged pixel block. Basically, since the three-dimensional recognition using the stereo matching is performed on the basis of the parallax d and the coordinate position corresponding to the parallax d of the pixel block PBij, the positional deviation on coordinates of the calculated parallax d may cause loose recognitions of vertical and horizontal positions. Particularly, objects not opposite to the image plane, for example, roads, lane markers and the like, are apt to be recognized loosely.

One of the features of the embodiment is that the region control section 10 changes the size of the reference pixel block PBij and the comparison pixel block in evaluating the correlation between the reference pixel block and the comparison pixel block. That is, the region control section 10 can vary the size of the reference pixel block PBij according to the area where the reference pixel block PBij is located. In this embodiment, the size of the reference pixel block PBij is varied according to whether objects are projected in an opposed manner to the image plane or objects are projected obliquely with respect to the image plane.

Figure 3:
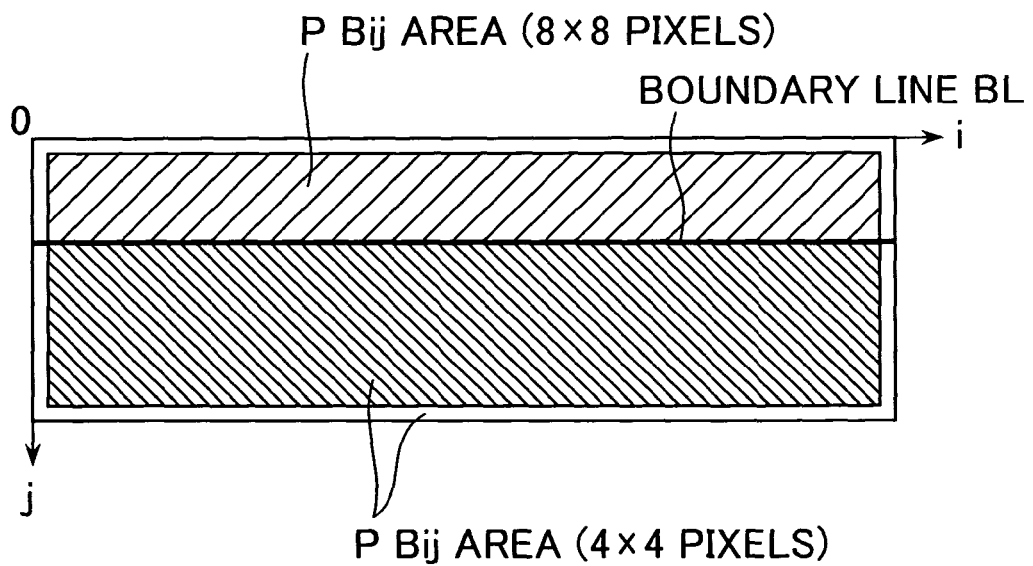
FIG. 3 is an explanatory view of respective areas in which the size of the pixel block PBij is changed over.

Referring to FIG. 3, in this embodiment, a boundary line BL extending horizontally is provided on the image plane and the size of the pixel block PBij is controlled differently at the respective areas divided by the boundary line BL. Specifically, the size of the pixel block PBij is established to 8×8 pixels at the area above the boundary line BL and the size of the pixel block PBij is established to 4×4 pixels at the area below the boundary line BL. The position of the boundary line BL is determined by a boundary determination section 15 which will be described hereinafter. The area below the boundary line BL is an area on which grounds, roads and the like are projected and the area above the boundary line BL is an area on which solid objects existing on the ground are projected.

FIG. 4a shows an example of a reference pixel block PBij having 8×8 pixels and FIG. 4b shows an example of a comparison pixel block PBij having 8×8 pixels. The city block distance CB is expressed as follows:

$$CB = \sum_{\text{lp;1p}} (|A33 - B33| + \ldots + |A66 - B66|) + K \sum [(|A11 - B11| + \ldots + |A88 - B88|) - (|A33 - B33| + \ldots + |A66 - B66|)]$$

[Formula 1]

where A11 ... A88 are brightness values of respective pixels pij in the reference pixel block PBij and B11 ... B88 are brightness values of respective pixels pij in the comparison pixel block PBij.

In the formula 1, the first term is the sum of the absolute values of differences of brightness values Aij, Bij positionally corresponding in a central region (4×4 pixels) and the second term is the sum of the absolute values of differences of brightness values Aij, Bij positionally corresponding in a surrounding region (obtained by subtracting central region from 8×8 pixels) The city block distance CB is calculated by adding the first term and the second term having a coefficient K. The coefficient K is given from the region control section 10 to the stereo matching section 8 and changes over from 1 to 0 and vise versa according to the position of the pixel block PBij and the position of the boundary line BL. Specifically, when the pixel block PBij is located at the area above the boundary line BL, the region control section 10 outputs an instruction that the coefficient K should be 1.0 and when the pixel block PBij is located at the area below the boundary line BL, the region control section 10 outputs an instruction that K should be 0.

In case where K=1 is given, the stereo matching section 8 evaluates the correlation with the pixel block PBij having 8×8 pixels (hereinafter referred to as the 8×8 pixel block). Further, in case where K=0 is given, the stereo matching section 8 evaluates the correlation with the pixel block PBij having 4×4 pixels (hereinafter referred to as the 4×4 pixel block). Thus, the region control section 10 acts as giving two sizes of the pixel block PBij, 4×4 pixels for a small size and 8×8 pixels for a large size.

In this embodiment, the number of calculated parallaxes d is equal to the number of the pixel blocks PBij having 4×4 pixels. Accordingly, in case where the 4×4 pixel blocks PBij are used according to the region control, after the evaluation of correlation is finished for a given pixel block PBij, as shown in FIG. 2, the next object of evaluation is an adjacent pixel block Pbi+1j. On the other hand, in case where the 8×8 pixel blocks PBij are used according to the region control, after the evaluation of correlation is finished for a given pixel block PBij, as shown in FIG. 2, the next object of evaluation shifts to a 8×8 pixel block PBi+1j horizontally overlapped by two pixels with the pixel block PBij. That is, the center of the pixel block PBij is away from the center of the pixel block Pbi+1j by four pixels. Similarly, the next object of evaluation is a pixel block PBij+1, this pixel block PBij+1 is a pixel block having 8×8 pixels vertically overlapped by two pixels with the pixel block PBij.

In case where the 8×8 pixel block PBij is used, sometimes the surrounding region of the pixel block PBij goes out of the effective image region at the edge of the four sides of the image. In this case, the correlation is evaluated with the small size, 4×4 pixel block PBij. The blank space is provided along the circumferential edge of the region above the boundary line BL for that purpose.

Thus, the stereo matching section 8 calculates the city block distance CB for every pixel block PBij using the pixel block PBij having 4×4 or 8×8 pixels, by means of horizontally shifting the comparison pixel block successively by one pixel. Further, the parallax calculating section 9 selects the comparison pixel block having the smallest city block distance and calculates the horizontal deviation between the reference pixel block PBij and the comparison pixel block as the parallax d. The stereoscopic image processing unit 7 calculates the parallaxes d for the entire image of one frame size, while changing the size of the pixel block PBij. Thus obtained distance data D are stored in a distance memory 12.

Reference numeral 13 denotes a micro-computer constituted by CPU, ROM, RAM, Input/Output interface and the like. In order to understand functionally, the micro-computer 13 is constituted of a recognition section 14 and a boundary determination section 15.

Based on respective information stored in the image data memory 11 and the distance data memory 12, the recognition section 14 recognizes roads and the like ahead of the own vehicle (road profiles recognition) or recognizes solid objects like vehicles in front of the own vehicle (solid objects recognition).

The road profiles recognition is to express three-dimensional road profiles by the function concerning left and right lane markers, no passing markers and the like and to establish respective parameters to such values as agreeing with actual road profiles (straight road, curved road, or ups and downs). For example, the recognition section 14 read reference image data from the image data memory 11 and identifies an object caused by markers from marker edges, that is, horizontal brightness edges (portion having a large variation of brightness between images adjacent to each other).

Substituting the coordinates (i, j) and the parallax d into a known coordinate conversion formula for every identified marker edge, coordinates (x, y, z) in the actual space established on the own vehicle is calculated. Thus established coordinate system has an origin on the road surface directly underneath the center of two cameras (stereoscopic camera), x axis extending in a widthwise direction of the own vehicle, y axis extending in a vertical direction of the vehicle and z axis extending in a lengthwise direction of the vehicle. Marker models are prepared based on the coordinates (x, y, z) of the respective marker edges in the actual space. That is, first, an approximation line is obtained for every specified interval with respect to the respective left and right marker edges extending forwardly. A marker model is expressed like a folded line by connecting thus obtained approximation lines with each other. Further, the marker model is constituted by a curve function (X=f(Z)) representing a curvature of the curve and a grade function (Y=f(Z)) representing a grade or an up and down. Thus, the three dimensional conditions of a road in the real space can be expressed by the left and right marker models.

Further, the recognition section 14 identifies the data above road surfaces as candidates of solid objects based on the detected road profiles (marker models). The candidates having similar distances in terms of z and x directions are treated as one group of solid objects. That is, the recognition section 14 identifies the group of solid objects located on the same lane as a preceding vehicle and identifies the group of solid objects located outside of the lane is identified as an oncoming vehicle, an obstacle or a side wall. Further, the recognition section 14 has a function of warning a driver by operating a warning device in case where it is judged that a warning is needed based on the result of the recognition. Also, the recognition section 14 has a function of controlling a vehicle by shifting down an automatic transmission, reducing engine power, or applying brakes based on the result of the recognition.

The boundary determination section 15 determines the boundary line BL for dividing the image plane into a plurality of areas. In this embodiment, the image plane is divided by a boundary line BL extending horizontally into two areas, an area on which road surfaces are projected and an area in which a solid object exists on the road surfaces. The position of the boundary line BL may be determined according to the statistics method, however, since the vehicle pitches and the road has ups and downs, it is preferable that the position of the boundary line BL is variable. According to the embodiment of the present invention, the boundary determination section 15 controls the position of the boundary line BL.

For that purpose, the boundary determination section 15 must know the present position of the ground surface. Specifically, first, the boundary determination section 15 calculates a vanishing point from a point of intersection of two left and right lane markers on the image plane based on the road profile recognized by the recognition section 14, using the parallelism of the lane markers. The boundary position between the ground and solid objects is determined to be located at a position downwardly offset by a few pixels. The boundary line BL is provided at the position. At this moment, the boundary determination section 15 outputs parameters for determining the boundary line BL to the region control section 10.

As understood from the description above, according to the method of processing stereoscopic images described in the first embodiment, the size of the pixel block PBij can be changed over between the small size and the large size in accordance with the area in the image plane. Hence, the correlation is evaluated with the 8×8 pixel block PBij in the area on which solid objects are projected and the correlation is evaluated with the 4×4 pixel block PBij in the area on which road surfaces are projected. As a result, the large size pixel block PBij can ensure the stereo matching. On the other hand, the small size pixel block PBij prevents deviations of parallaxes caused by the large size of the pixel block PBij. As a result, the recognition accuracy of the road surface, particularly in a horizontal and vertical direction can be ensured.

In this embodiment, the size of the pixel block PBij is changed over between two sizes, 4×4 pixels and 8×8 pixels, however, the size of the pixel block PBij is not limited to these sizes. Appropriate number of pixels can be used as desired. Further, in this embodiment, the image plane is divided into two regions by the boundary line BL, however, the image plane may be divided into three or more areas by a plurality of boundary lines. In this case, the size of the pixel block PBij may be changed over according to the area.

In the aforesaid embodiment, the size of the pixel block PBij is changed over by changing over the value of K in the formula 1. On the other hand, the city block distance CB can be defined as the sum of weighted absolute value of the difference between two brightness Values Aij, Bij corresponding to each other for the entire pixel blocks PBij.

$$CB = \Sigma(w11|A11-B11|+ \ldots +w88|A88-B88|) \quad (2)$$

FIG. 5a shows an example of the pixel block PBij obtaining the size of 8×8 pixels by applying the weight factor wij=1 to each pixel and FIG. 5b is an example of the pixel block PBij obtaining the size of 4×4 pixels by applying the weight factor wij=1 to each pixel of the central region and wij=0 to each pixel of the surrounding region. The change of the weight factor wij is instructed from the region control section 10 in the same manner as the change of the aforesaid coefficient K.

In case where the correlation of the pixel block PBij is evaluated with the large size (8×8 pixels) of the pixel block PBij, as the matching goes apart from the center of the pixel block, the reliability of the comparison image data declines. To prevent this, the weight factors may be established to 1.0 in the central region and at the same time the weight factors may be gradually decreased in the surrounding region.

Figure 6:
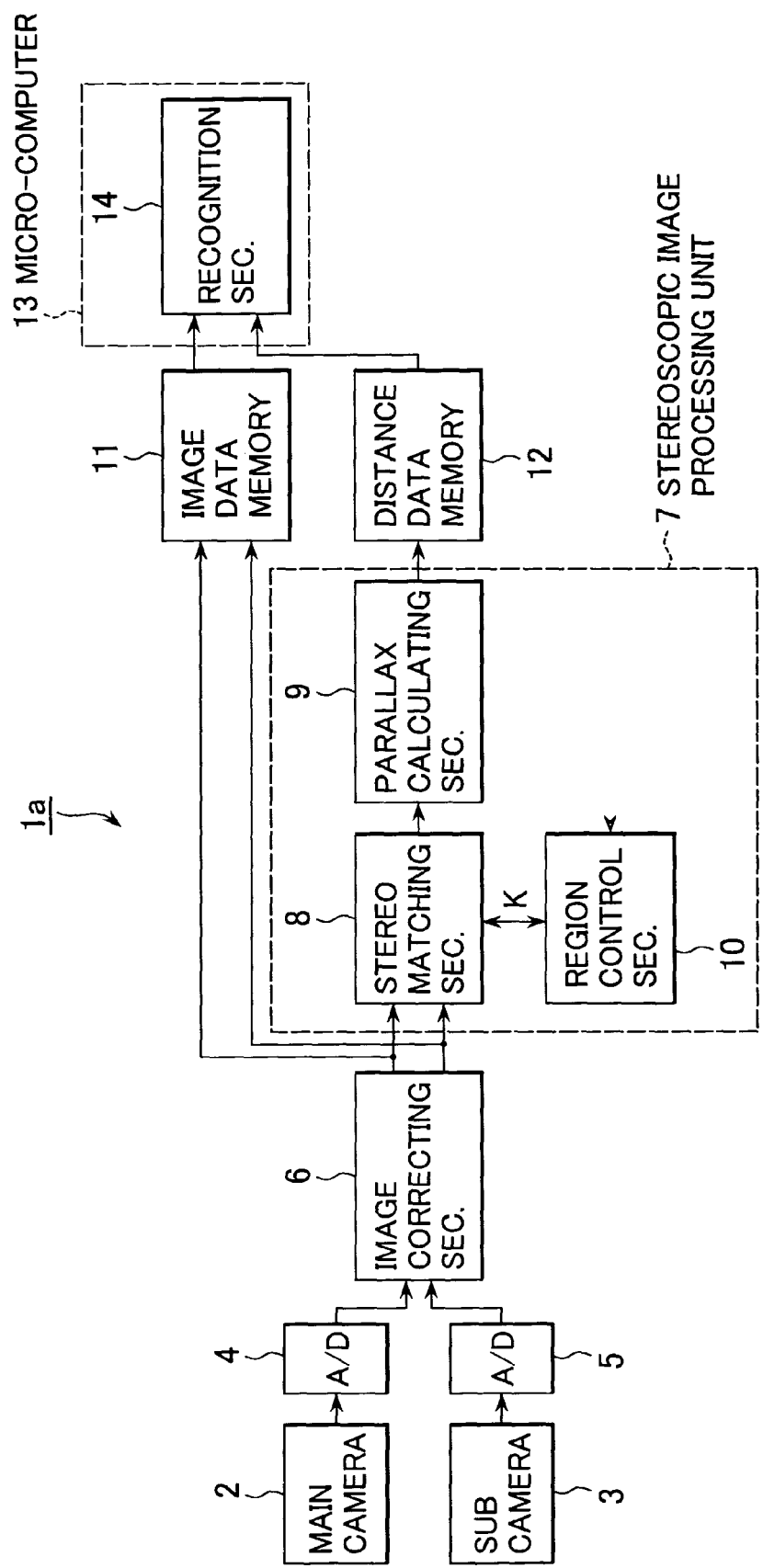
FIG. 6 is a schematic block diagram showing a stereoscopic image processing apparatus according to a second embodiment of the present invention.

FIG. 6 is a schematic block diagram showing a stereoscopic image processing apparatus 1a according to a second embodiment of the present invention. In the second embodiment, the components of the stereoscopic image processing apparatus 1a which are identical to the first embodiment are denoted by identical reference numbers and are not described in detail.

The difference of the second embodiment from the first embodiment is to change over the size of the pixel block according to imaging circumstances. Specifically, the region control section 10 changes over the size of the pixel block PBij from the small size (4×4 pixels) to the large size (8×8 pixels) in surrounding conditions such as rain, nighttime, smog, backlight, snowy roads and the like, regardless of the area of the image. Because, since images taken in these conditions have small contrast, using the large size pixel block PBij is advantageous in securing the stereo matching.

Referring to FIG. 7, the routine of the flowchart is energized at a specified interval and executed by the region control section 10. First, at a step 1, it is judged whether or not the weather is rain by a wiper switch (not shown) turned on or off. Otherwise, the judgment of rainy condition can be made based on the number of the data isolated from the grouped solid object data. Further, otherwise, the rainy condition can be judged from the number of mismatches which occurs when the brightness of the reference pixel block PBij coincides with the brightness of a positionally unrelated comparison pixel block. That is, in the rainy condition, droplets on the front windshield of the vehicle or raindrops increase isolated data or mismatches. Further, if it is detected that the wiper switch is turned on, more accurate judgment of the rainy condition can be expected.

In case where the judgment is affirmative, namely, in case where images are taken in the rainy condition, the program goes to a step 7 and in case where the judgment is negative, namely, in case of no rain, the program goes to a step 2.

At the step 2, it is judged whether or not images are taken in nighttime. The nighttime condition is judged from whether a head light switch is turned on or off. Otherwise, the nighttime condition can be judged from the quantity of exposure of the cameras 2, 3. The quantity of exposure is calculated by an exposure control section (not shown). The exposure control section controls parameters (for example, shutter speeds, apertures of lenses and amplification gains) for adjusting the quantity of exposure so as to obtain an optimum brightness at the next frame of image based on the present brightness value. It is possible to judge the nighttime condition by using these parameters as a judgment criteria. Further, it is possible to judge the nighttime condition more accurately by using the result of the judgment together with the ON/OFF condition of the headlight switch.

If the judgment of the nighttime condition is affirmative, that is, in case where images are taken in the nighttime, the program goes to the step 7 and if it is negative, that is, in case where it is not the nighttime condition, the program goes to a step 3.

Judgments of smog, backlight and snowy road are made at steps 3, 4 and 5, respectively. The judgment of smog is performed based on the number of the distance data (parallax d) within a specified region and the number of the brightness edges in the image. The judgment of backlight is performed based on the quantity of exposure of the cameras 2, 3, the average brightness values at the upper part of the image and the average brightness values at the lower part of the image. Further, the judgment of snowy road is performed based on the average brightness or the number of brightness edges within a specified road surface area.

In case where all judgments from the step 1 to 5 are negative, since it is judged that the imaging condition is not so bad as needing the large size of the pixel block PBij, the size of the pixel block PBij is established to 4×4 pixels. At this moment, the region control section 10 changes over the size of the pixel block from 8×8 pixels to 4×4 pixels. In case where the size of the pixel block is already 4×4 pixels, that size is maintained.

On the other hand, in case where either of the steps 1 to 5 is affirmative, it is judged that the imaging condition is so bad as needing the large size of the pixel block for securing the stereo matching and the size of the pixel block PBij is established to 8×8 pixels. At this moment, the region control section 10 changes over the size of the pixel block from 4×4 pixels to 8×8 pixels. In case where the size of the pixel block is already 8×8 pixels, that size is maintained.

Thus, after the size of the pixel block PBij is determined, the stereoscopic image processing unit 7 calculates the city block distance CB for every comparison pixel block PBij over the entire specified searching area while shifting the comparison pixel block PBij by one pixel horizontally/vertically and determines the comparison pixel block having the correlation in brightness between the reference and comparison pixel blocks. The stereoscopic image processing unit 7 calculates the parallaxes d successively with respect to the image of one frame.

As described above, according to the second embodiment, since the optimum size of the pixel block PBij to be evaluated can be selected in accordance with the imaging conditions such as rain, smog, nighttime and the like, more accurate three-dimensional recognitions can be accomplished for the entire image of one frame.

In the embodiments described above, rain, nighttime, smog, snow on road are exemplified as bad imaging conditions, however, the present invention is not limited to these. Sandstorm, darkness in tunnels, stain on windshields, stain on lenses of the cameras 2, 3 etc. may be included in the bad imaging conditions.

The entire contents of Japanese Patent Application No. Tokugan 2002-282644 filed Sep. 27, 2002, is incorporated herein by reference.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. A stereoscopic image processing apparatus for calculating a parallax between a pair of stereographic images, comprising:
   correlation evaluating means for evaluating a correlation of brightness between a first pixel block provided in one of said pair of stereographic images and a second pixel block provided in the other of said pair of stereographic images; and
   region size changing means for changing a size of said first and second pixel blocks for said correlation evaluating means,
   wherein a size of said first and second pixel blocks is changed in accordance with an area where said first pixel block is located in the respective pair of images.

2. The stereoscopic image processing apparatus according to claim 1, further comprising a boundary determining section, the boundary determining section being configured to divide the stereographic images into two areas, an upper area and a lower area, defined by a horizontal boundary line.

3. The stereoscopic image processing apparatus according to claim 2, wherein the region size changing means changes said size of said first and second pixel blocks to a first size when said first pixel block is located in said lower area.

4. The stereoscopic image processing apparatus according to claim 1, wherein said area of the stereographic images is divided into a plurality of areas and a size of said first and second pixel blocks is changed to a respective specified size of said first pixel block in accordance with said respective areas where said first pixel block is located.

5. The stereoscopic image processing apparatus according to claim 1, wherein said first and second pixel blocks have a first size and a second size, respectively, the second size being larger than said first size.

6. The stereoscopic image processing apparatus according to claim 1, wherein the region size changing means changes said size of said first and second pixel blocks in accordance with imaging conditions, the imaging conditions including rain, fog, snow, backlight, nighttime, snow on road, stain or droplet on front windshield.

7. A stereoscopic image processing apparatus for calculating a parallax between a pair of images, comprising:
   correlation evaluating means for evaluating a correlation of brightness between a first pixel block provided in one of said pair of images and a second pixel block provided in the other of said pair of images;
   weighting factor means for applying a weighting factor to each pixel constituting said first and second pixel blocks in evaluating said correlation; and
   weighting factor changing means for changing said weighting factor for said correlation evaluating means, wherein:
   the weighting factor is established to ZERO at a surrounding region away from a central region of the first and second pixel blocks to reduce a size of the first and second pixel blocks in a small pixel block comparison, and
   the weighting factor is established to ONE at the surrounding region away from the central region of the first and second pixel blocks, to increase the size of the first and second pixel blocks in a larger pixel block comparison.

8. A stereoscopic image processing method of calculating a parallax between a pair of stereographic images in a stereoscopic image processing apparatus, the method comprising:
   evaluating a correlation of brightness between a first pixel block provided in one of said pair of stereographic images and a second pixel block provided in the other of said pair of stereographic images; and
   changing a size of said first and second pixel blocks, wherein the changing of the size of the first and second pixel blocks includes changing the pixel blocks in accordance with an area where the first pixel block is located.

9. The method according to claim 8 further comprising dividing said area into two areas, an upper area and a lower area, by a horizontal boundary line.

10. The method according to claim 8, further comprising dividing said area into a plurality of areas by a plurality of boundary lines.

11. A stereoscopic image processing method of calculating a parallax between a pair of images in a stereoscopic image processing apparatus, the method comprising:
   evaluating a correlation of brightness between a first pixel block provided in one of said pair of images and a second pixel block provided in the other of said pair of images;
   dividing each of said pair of images into two areas, an upper area and a lower area, by a horizontal boundary line;
   applying a weighting factor to each pixel constituting said first and second pixel blocks for said evaluating said correlation based on whether each said pixel is in the upper area or in the lower area; and changing over said weighting factor for evaluating said correlation.

12. The apparatus of claim 1, further comprising a parallax calculating means for calculating a parallax between the pair of images based upon the correlation of brightness.

13. The apparatus of claim 1, wherein the region size changing means changes a size of the first and second pixel blocks based upon the location of one of the first and second pixel blocks within a corresponding one of the pair of images.

14. The apparatus of claim 13, wherein the region size changing means changes a size of the first and second pixel blocks based upon the location of one of the first and second pixel blocks within a corresponding one of the pair of images with respect to a horizontal line in said corresponding one of the pair of images.

15. The apparatus of claim 14, wherein the region size changing means changes a size of the first and second pixel blocks such that said size of said first and second pixel blocks is larger above the horizontal line and smaller below the horizontal line.

16. The apparatus of claim 15, wherein the first pixel block and the second pixel block comprise an 8×8 pixel block above the horizontal line and the first pixel block and the second pixel block comprise a 4×4 pixel block below the horizontal line.

17. The apparatus of claim 1, wherein the region size changing means changes a size of the first and second pixel blocks based on whether an object in an image is projected in a manner opposed to a plane of the image or is projected obliquely to the image plane.

18. The apparatus of claim 1, further comprising weighting factor means for applying a weighting factor to each pixel constituting said first and second pixel blocks.

19. The method of claim 8, further comprising applying a weighting factor to each pixel in said first and second pixel blocks.

* * * * *